(12) United States Patent
Yoshida

(10) Patent No.: US 6,690,559 B2
(45) Date of Patent: Feb. 10, 2004

(54) CHARGE/DISCHARGE TYPE POWER SUPPLY

(75) Inventor: Shinichi Yoshida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 300 days.

(21) Appl. No.: 09/872,351

(22) Filed: Jun. 1, 2001

(65) Prior Publication Data

US 2002/0018329 A1 Feb. 14, 2002

(30) Foreign Application Priority Data

Jun. 2, 2000 (JP) .......................................... 2000-166211

(51) Int. Cl.[7] ................................................ H02H 9/02
(52) U.S. Cl. ....................................... 361/100; 320/134
(58) Field of Search .................. 361/100, 79; 320/21, 320/22, 31, 32, 39, 122–136, 155

(56) References Cited

U.S. PATENT DOCUMENTS

| | | | |
|---|---|---|---|
| 5,808,446 A | * | 9/1998 | Eguchi ........................ 320/134 |
| 5,990,663 A | * | 11/1999 | Mukainakano ............... 320/134 |
| 6,060,863 A | * | 5/2000 | Sakurai et al. ............... 320/136 |
| 6,111,388 A | * | 8/2000 | Mukainakano ............... 320/134 |
| 6,239,581 B1 | * | 5/2001 | Yoshida ........................ 320/162 |
| 6,331,763 B1 | * | 12/2001 | Thomas et al. .............. 320/136 |

* cited by examiner

Primary Examiner—Gregory J. Toatley, Jr.
Assistant Examiner—Boris Benenson
(74) Attorney, Agent, or Firm—Brinks Hofer Gilson & Lione

(57) ABSTRACT

There is provided a charge/discharge type power supply that includes a MOS transistor (normally called "four-terminal MOS transistor") of which a source, a drain, a gate and a body are separated from each other as a switching element that controls both of the charge operation and the discharge operation, and provides a charge/discharge control circuit with a function of controlling the charge/discharge operation in accordance with a voltage of a secondary battery, a function of detecting a voltage that varies in accordance with a current that flows in the switching elements to control the charge/discharge operation, and a function of recognizing whether a charger or a load is connected to an external connection terminal to control the charge/discharge operation; wherein one signal line is used for controlling the on/off operation of the switching element, and both of the charge operation and the discharge operation can be controlled without any diode.

22 Claims, 9 Drawing Sheets

FIG. 4

CONTROL TABLE OF CHARGE/DISCHARGE CONTROL CIRCUIT IN THE CASE WHERE ONE SECONDARY BATTERY IS PROVIDED

| STATE | OVER-CHARGE DETECTING CIRCUIT OUTPUT | OVER-DISCHARGE DETECTING CIRCUIT OUTPUT | OVER-CURRENT DETECTING CIRCUIT OUTPUT | CHARGER DETECTING CIRCUIT OUTPUT | CHARGE/DISCHARGE CONTROL MOS TRANSISTOR |
|---|---|---|---|---|---|
| 1 | 0 | 0 | 0 | 0 | ON |
| 2 | 0 | 0 | 0 | 1 | ON |
| 3 | 0 | 0 | 1 | 0 | OFF |
| 4 | 0 | 1 | 0 | 1 | OFF |
| 5 | 0 | 1 | 0 | 0 | ON |
| 6 | 0 | 0 | 1 | 0 | OFF |
| 7 | 1 | 0 | 0 | 1 | ON |
| 8 | 1 | 0 | 0 | 0 | OFF |
| 9 | 1 | 0 | 1 | 0 | OFF |

COMMENT: "0" IS AN UNDETECTED STATE AND "1" IS A DETECTED STATE

FIG. 5

CONTROL TABLE OF CHARGE/DISCHARGE CONTROL CIRCUIT IN THE CASE WHERE TWO OR MORE SECONDARY BATTERY ARE CONNECTED IN SERIES

| STATE | OVER-CHARGE DETECTING CIRCUIT OUTPUT | OVER-DISCHARGE DETECTING CIRCUIT OUTPUT | OVER-CURRENT DETECTING CIRCUIT OUTPUT | CHARGER DETECTING CIRCUIT OUTPUT | CHARGE/DISCHARGE CONTROL MOS TRANSISTOR |
|---|---|---|---|---|---|
| 1 | 0 | 0 | 0 | 0 | ON |
| 2 | 0 | 0 | 0 | 1 | ON |
| 3 | 0 | 0 | 1 | 0 | OFF |
| 4 | 0 | 1 | 0 | 0 | OFF |
| 5 | 0 | 1 | 1 | 1 | ON |
| 6 | 1 | 0 | 0 | 0 | OFF |
| 7 | 1 | 0 | 0 | 1 | ON |
| 8 | 1 | 0 | 1 | 0 | OFF |
| 9 | 1 | 1 | 0 | 0 | OFF |
| 10 | 1 | 1 | 0 | 1 | OFF |
| 11 | 1 | 1 | 0 | 1 | OFF |
| 12 | 1 | 1 | 1 | 0 | OFF |

COMMENT:"0" IS AN UNDETECTED STATE AND "1" IS A DETECTED STATE

CHARGE/DISCHARGE TYPE POWER SUPPLY

BACKGROUND OF THE INVENTION

1. Field of the Invention

The present invention relates to a charge/discharge control circuit that is capable of controlling charging and discharging of a secondary battery, and a charge/discharge type power supply using the circuit.

2. Description of the Related Art

As a conventional charge/discharge power supply, there has been known a charge/discharge type power supply 200 as shown in FIG. 2. In the charge/discharge type power supply 200, the positive pole of a secondary battery 204 is connected with an external connection positive terminal 205 to which a charger 208 or a load 207 is connected, and the negative pole of the secondary battery 204 is connected with an external connection negative terminal 206 to which the charger 208 or the load 207 is connected through a MOS transistor 202A and its parasitic diode 203A as well as a MOS transistor 202B and its parasitic diode 203B. In addition, a charge/discharge control circuit 201 is connected in parallel with the secondary battery 204. The charge/discharge control circuit 201 can detect a voltage across the secondary battery 204 and voltages across the MOS transistors 202A and 202B.

When the secondary battery 204 is in an over-discharge state, in which the battery output is lower than a predetermined voltage value (hereinafter referred to as "over-discharge state"), and/or when the secondary battery 204 is in an over-current state, in which the voltages across the MOS transistors 202A and 202B are higher than a predetermined voltage value (hereinafter referred to as "over-current state"), a signal is outputted from the discharge control terminal 213A of the charge/discharge control circuit 201 so that the MOS transistor 202A is turned off.

When the secondary battery 204 is in an over-charge state, in which the battery output is higher than the predetermined voltage value (hereinafter referred to as "over-charge state"), a signal is outputted from the charge control terminal 213B of the charge/discharge control circuit 201 so that the MOS transistor 202B is turned off.

In FIG. 2, an n-channel type is used for the MOS transistors. In another example, two p-channel MOS transistors each having a parasitic diode are connected in series between the positive pole of the secondary battery 204 and the external connection positive terminal 205 to which the charger 208 or the load 207 is connected.

However, the conventional charge/discharge power supply thus structured requires a diode that provides a discharge path when a charge control switch element is off, and a diode that provides a charge path when a discharge control switch element is off.

Accordingly, in the case of discharging the secondary battery which is in the over-charge state, since the charge control MOS transistor is off, a current flows through the parasitic diode connected in parallel with the charge control MOS transistor, with the result that the discharge efficiency is impaired due to heating at the parasitic diode. Also, the discharge current is restricted to the maximum permissible current value of the parasitic diode.

Also, in the case of charging the secondary battery which is in the over-discharge state, since the discharge control MOS transistor is off, a charge current flows through the parasitic diode connected in parallel with the discharge control MOS transistor, with the result that the charge efficiency is impaired due to heating at the parasitic diode. Also, the charge current is restricted to the maximum permissible current value of the parasitic diode.

In addition, in the conventional charge/discharge power supply, because the charge operation and the discharge operation are on/off controlled by different switching elements, two signal lines consisting of a charge control signal line and a discharge control signal line are required. For that reason, there are required two output terminals of the charge/discharge control circuit, two wirings extending from the charge/discharge control circuit to the switching elements, and two switching elements. Also, the possibility is so much the higher that the wiring functions as an antenna and high-frequency noises (for example, noises which occur when suffering electric waves of a cellar phone are received) come into the charge/discharge control circuit, to thereby lead to the malfunction of the on/off control of the switch elements.

SUMMARY OF THE INVENTION

Under the above circumstances, the present invention has been made to solve the above problems with the conventional power supply, and therefore an object of the present invention is to provide a charge/discharge type power supply that eliminates charge operation and discharge operation through diodes and controls both the charge operation and the discharge operation and the discharge operation of a secondary battery by one signal line.

In order to solve the above problem, according to the present invention, there is provided a charge/discharge type power supply that includes a MOS transistor (hereinafter referred to as "four-terminal MOS transistor") of which a source, a drain, a gate and a body are separated from each other as a switching element that controls both of the charge operation and the discharge operation, and provides a charge/discharge control circuit with a function of controlling the charge/discharge operation in accordance with a voltage of a secondary battery, a function of detecting a voltage that varies in accordance with a current that flows in the switching elements to control the charge/discharge operation, and a function of recognizing whether a charger or a load is connected to an external connection terminal to control the charge/discharge operation; in which one signal line is used for controlling the on/off operation of the switching element, and both of the charge operation and the discharge operation can be controlled without any diode.

In the charge/discharge type power supply thus structured, since the charge operation and the discharge operation through a diode are eliminated, the charging efficiency is enhanced to terminate the charge operation in a short period of time, and the discharging efficiency is enhanced to elongate the lifetime of the secondary battery. Also, since both of the charge operation and the discharge operation are controlled by using one signal line, the number of output terminals of the charge/discharge control circuit, the number of wirings extending from the charge/discharge control circuit to the switching elements and the number of switching elements are reduced, a chip area, a PKG area and a mounted area of the charge/discharge control circuit are reduced, and the number of parts to be used is reduced, thereby making it possible to downsize the charge/discharge type power supply and reduce the costs. Also, since the number of wirings is reduced, the rate of malfunction occurrence due to a high frequency noise is lessened.

BRIEF DESCRIPTION OF THE DRAWINGS

These and other objects and advantages of this invention will become more fully apparent from the following detailed description taken with the accompanying drawings in which:

FIG. 4 is a control table of a charge/discharge control circuit in the case where one secondary battery is provided in accordance with the present invention;

FIG. 5 is a control table of the charge/discharge control circuit in the case where two or more secondary batteries are connected in series in accordance with the present invention;

DETAILED DESCRIPTION OF THE PREFERRED EMBODIMENTS

Now, a description will be given in more detail of the embodiments of the present invention with reference to FIGS. 1 and 3.

Figure 1:
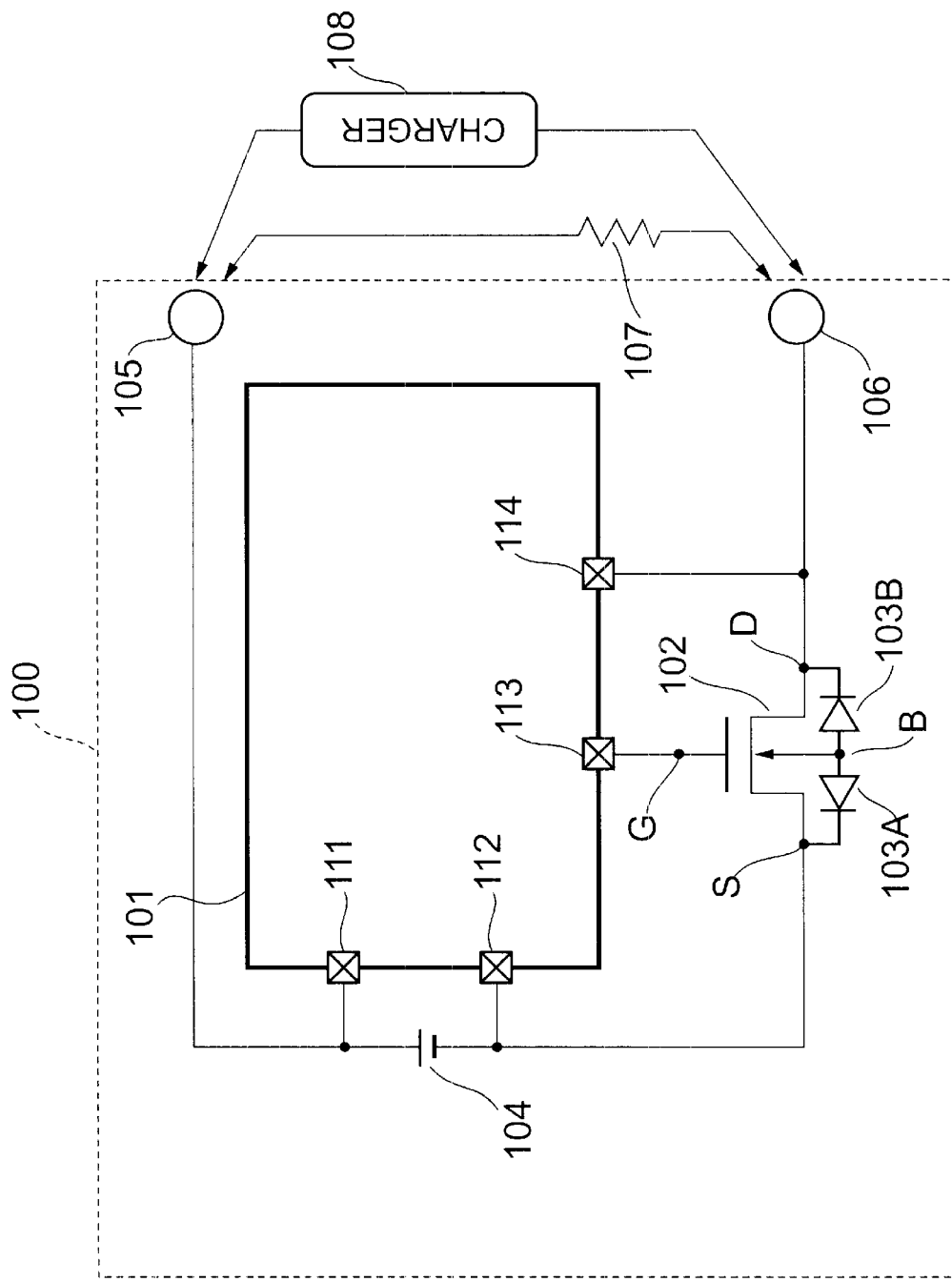
FIG. 1 is an explanatory diagram showing a circuit block of a charge/discharge type power supply in accordance with the present invention.
Figure 2:
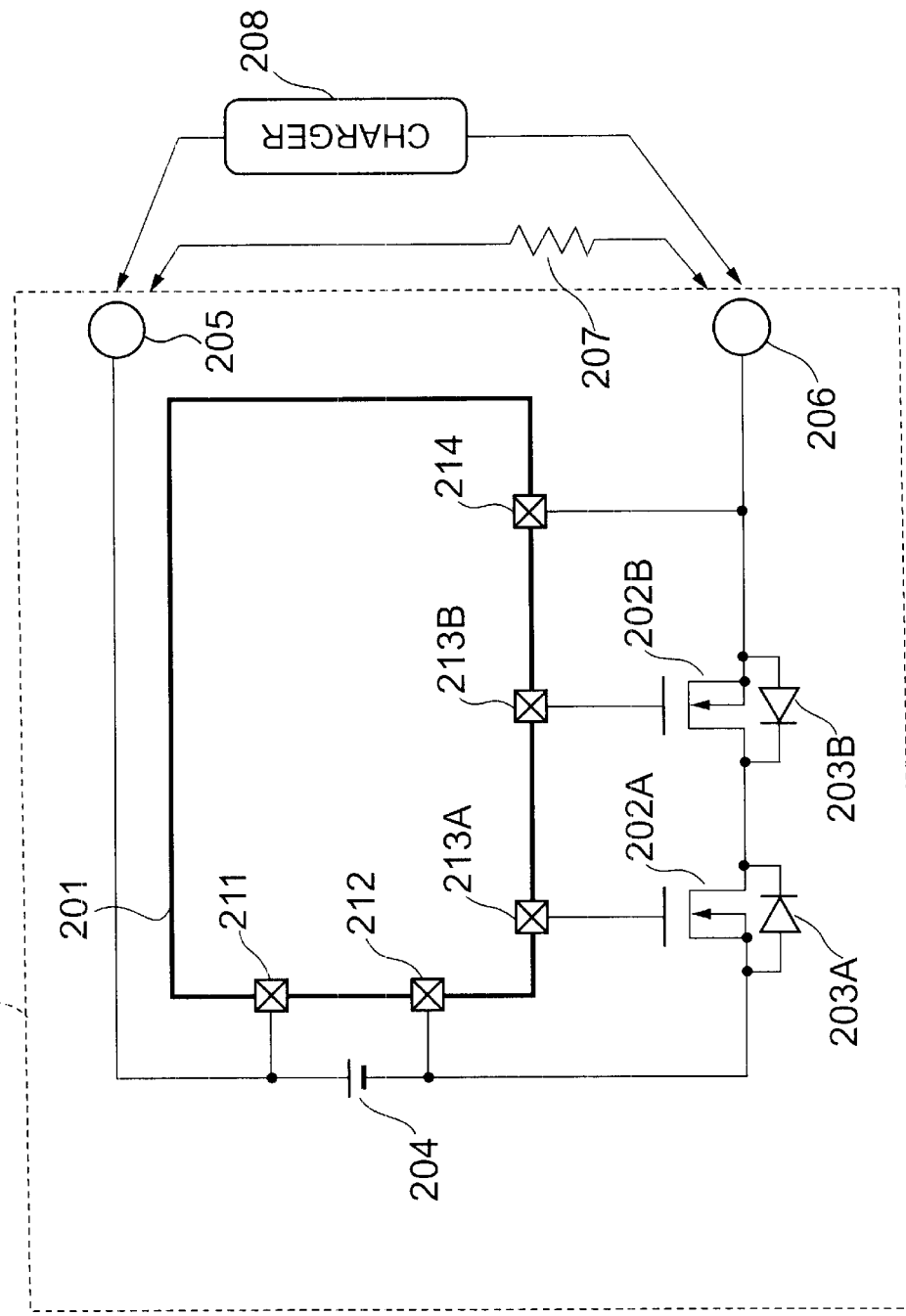
FIG. 2 is an explanatory diagram showing a circuit block of a conventional charge/discharge type power supply.

FIG. 1 is a circuit block diagram showing a charge/discharge type power supply in accordance with the present invention.

In the charge/discharge type power supply 100, the positive pole of a secondary battery 104 is connected with an external connection positive terminal 105 to which a charger 108 or a load 107 is connected, and the negative pole of the secondary battery 104 is connected with an external connection negative terminal 106 to which the charger 108 or the load 107 is connected through a MOS transistor 102.

The MOS transistor 102 has a source S, a drain D, a gate G and a body B separated from each other, and parasitic diodes 103A and 103B are inserted between the body B and the source S of the MOS transistor 102 and between the body B and the drain D thereof, respectively, so as to be oppositely directed. (In the MOS transistor 102, because the body B and the source S are separated from each other, there is no difference in structure between the source S and the drain D, and the source S and the drain D may be reversed. For convenience, in the present invention, the one which is connected to the secondary battery 104 side is called "source").

The diodes 103A and 103B are not necessarily formed of the parasitic diodes. Schottky diodes or the like may be externally fitted.

Also, in the charge/discharge type power supply 100, a charge/discharge control circuit 101 is connected in parallel with the secondary battery 104. The charge/discharge control circuit 101 has a function of detecting a voltage across the secondary battery 104 and a voltage across the switching element 102.

When the secondary battery 104 is in the over-charge state, the over-discharge state or the over-current state, a signal is outputted from the charge/discharge control terminal 113 of the charge/discharge control circuit 101 so that the MOS transistor 102 is turned off.

Then, the charge/discharge control circuit 101 will be described in detail.

Figure 3:
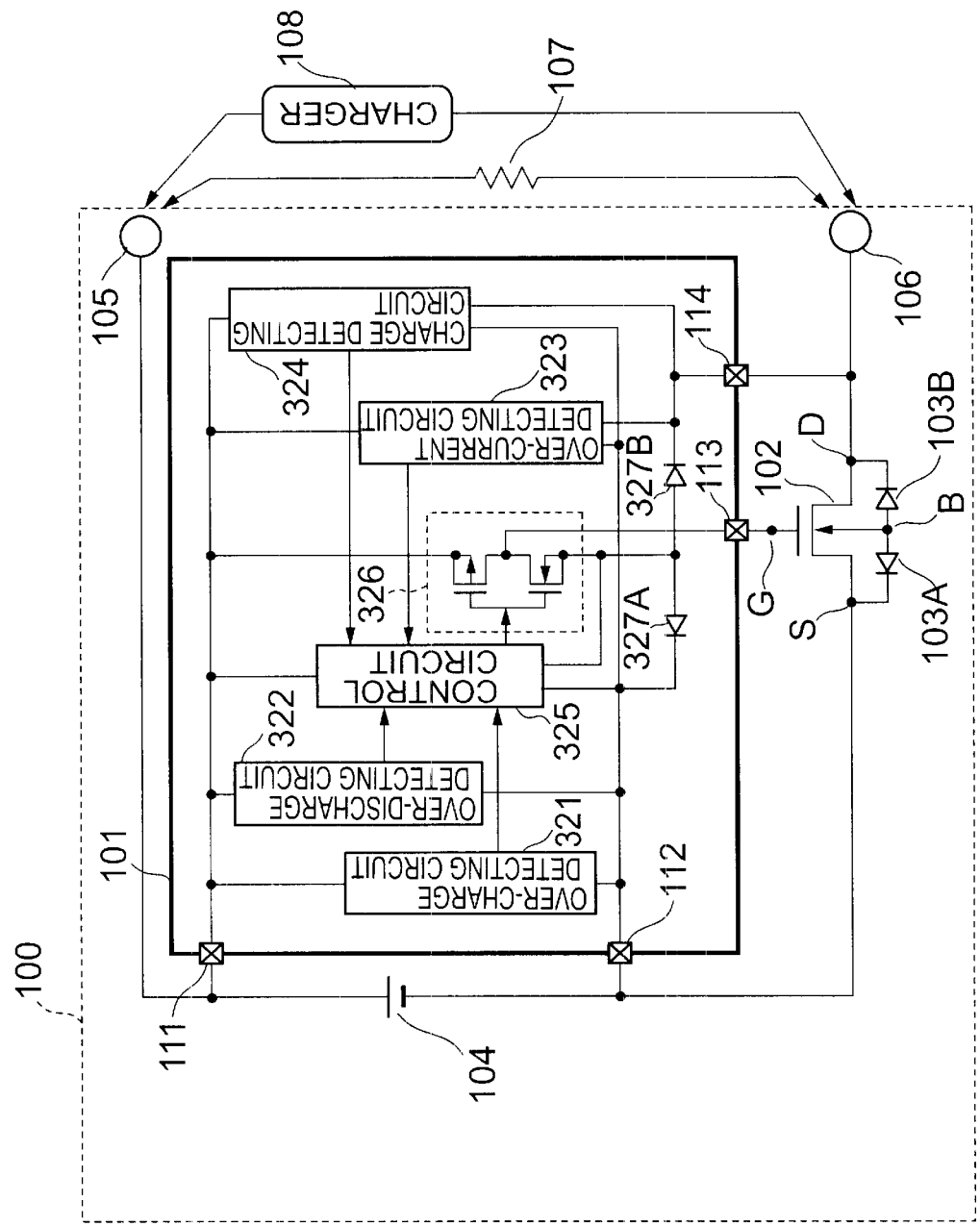
FIG. 3 is an explanatory diagram showing a detailed circuit block of the charge/discharge type power supply in accordance with the present invention.

FIG. 3 is a circuit block diagram showing the details of the charge/discharge control circuit in accordance with the present invention.

The charge/discharge control circuit 101 includes an over-charge detecting circuit 321 for detecting that the voltage of the secondary battery 104 is higher than a predetermined voltage value (an over-charge detection voltage), an over-discharge detecting circuit 322 for detecting that the voltage of the secondary battery 104 is lower than a predetermined voltage value (an over-discharge detection voltage), an over-current detecting circuit 323 for detecting that the voltage across the MOS transistor 102 is higher than a predetermined voltage value (an over-current detection voltage), a charger detecting circuit 324 for detecting that a voltage between the external connection positive terminal 105 and the external connection negative terminal 106 is higher than a predetermined voltage value (a charger detection voltage), a control circuit 325 for outputting a control signal to the gate G of the MOS transistor 102 that controls the charge/discharge operation of the secondary battery 104 upon receiving output signals from the over-charge detecting circuit 321, the over-discharge detecting circuit 322, the over-current detecting circuit 323 and the charger detecting circuit 324, a charge/discharge control circuit output driver 326, and a diode 327A and a diode 327B for selecting the lower of the voltage of the negative connection terminal of the secondary battery or the voltage of the over-current detection terminal.

The control circuit 325 performs control shown in FIG. 4, in which one secondary battery is provided, and performs control shown in FIG. 5, in which two or more secondary batteries are provided. In the tables, "0" represents an undetected state whereas "1" represents a detected state.

The states 1 and 2 represent that both of the charge and discharge operations can be freely conducted because the voltage across the secondary battery 104 is not lower than the over-discharge detection voltage and not higher than the over-charge detection voltage, and the voltage across the MOS transistor 102 is the over-current detection voltage or less (the MOS transistor 102 is turned on).

The states 3, 6 and 9 represent that the discharge operation cannot be conducted (the MOS transistor 102 is turned off) because the voltage across the MOS transistor 102 is the over-current detection voltage or more.

The states 4 and 5 represent that the charge operation can be conducted but the discharge operation cannot be conducted (when the charger is not detected, the MOS transistor 102 is turned off, and when the charger is detected, the MOS transistor 102 is turned on) because the voltage across the secondary battery 104 is the over-discharge detection voltage or less.

The states 7 and 8 represent that the charge operation cannot be conducted but the discharge operation can be conducted (when the charger is not detected, the MOS transistor 102 is turned on, and when the charger is detected, the MOS transistor 102 is turned off) because the voltage across the secondary battery 104 is the over-discharge detection voltage or more.

The states 10 to 12 of FIG. 5 represent that neither the charge operation nor the discharge operation cannot be conducted because among two or more secondary batteries connected in series, a battery which is in the over-charge state and a battery which is in the over-discharge state coexist.

The circuit must be devised in such a manner that the discharge operation can be conducted when the load 107 is connected in the state where the secondary battery 104 is in the over-charge state, and the MOS transistor 102 is off.

When the load 107 is connected when the secondary battery 104 is in the over-charge state and the MOS transistor 102 is in an off state, since the voltage of the over-current detection terminal 114 rises due to the load 107 (the rise in voltage is caused under the influence of the positive voltage of the secondary battery 104 and rises), the over-current detecting circuit 323 detects the over-current. Referring to the table of FIG. 4, when the load is connected in the over-charge state and no delay time occurs in the detection of the over-current, because the state is shifted to the state 9 from the state 8 skipping the state 7, there is the possibility that the discharge operation cannot be conducted. This is very inconvenient because the discharge operation cannot be conducted despite the sufficient battery voltage.

In the case where a delay time occurs in the detection of the over-current, the state is held for a fixed period of time not skipping the state 7, so that if the load is connected in the over-charge state, the state is shifted to the state 7 from the state 8, thereby being capable of conducting the discharge operation.

Figure 6:
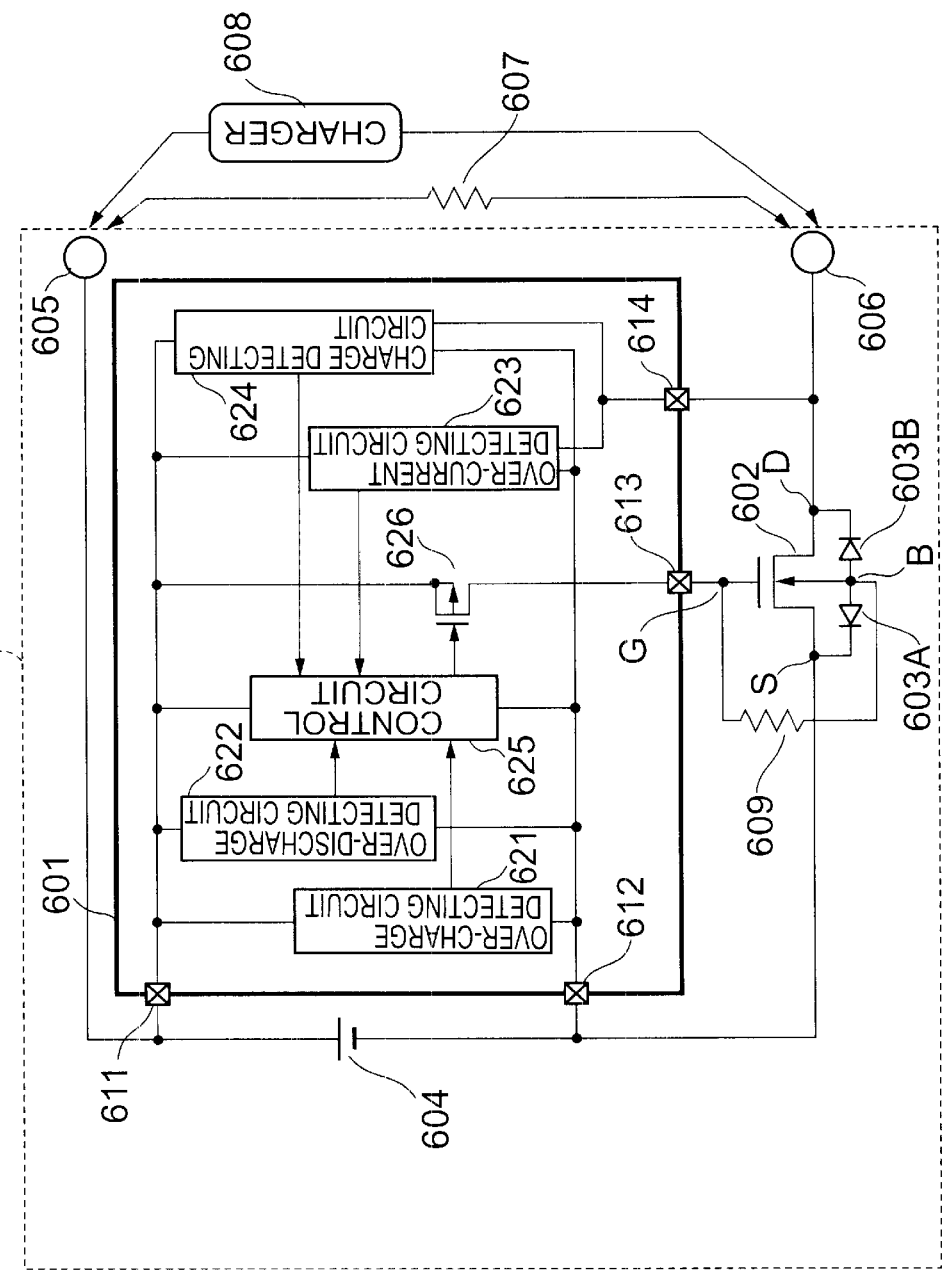
FIG. 6 is a circuit block diagram showing another example of the charge/discharge type power supply in accordance with the present invention.

Another embodiment of the present invention will be described with reference to FIG. 6. Differences from FIG. 3 reside in that an output driver 626 of a charge/discharge control circuit 601 is formed of p-channel open drain, and a pull-down resistor 609 is added between the gate G and the body B of a four-terminal MOS transistor 602 for controlling the charge/discharge operation. The circuit shown in FIG. 6 is advantageous in that the low side of the output voltage of the charge/discharge control terminal 613 may not be produced within the charge/discharge control circuit 601. In FIG. 3, there are provided the diodes 327A and 327B for selecting the lower of the negative connection terminal 112 voltage of the secondary battery or the external connection negative terminal 114 voltage. In contrast, in FIG. 6, since the charge/discharge control circuit output driver 626 is formed of the p-channel open drain, when turning off the MOS transistor 602, the charge/discharge control circuit output driver 626 is turned off, whereby the gate G voltage of the MOS transistor 602 can be pulled down to the body B voltage by the pull down resistor 609.

In a state where the charge type power supply 600 is chargeable or dischargeable, because the current is consumed through the pull down resistor 609, it is desirable that the resistance of the pull down resistor 609 is large. However, if the resistance is too large, since the charge/discharge control MOS transistor 602 cannot be turned off by the leak current of the output transistor of the charge/discharge control circuit, it is desirable that the resistance of the pull down resistor 609 ranges from 100 k Ω to 10 M Ω.

Figure 7:
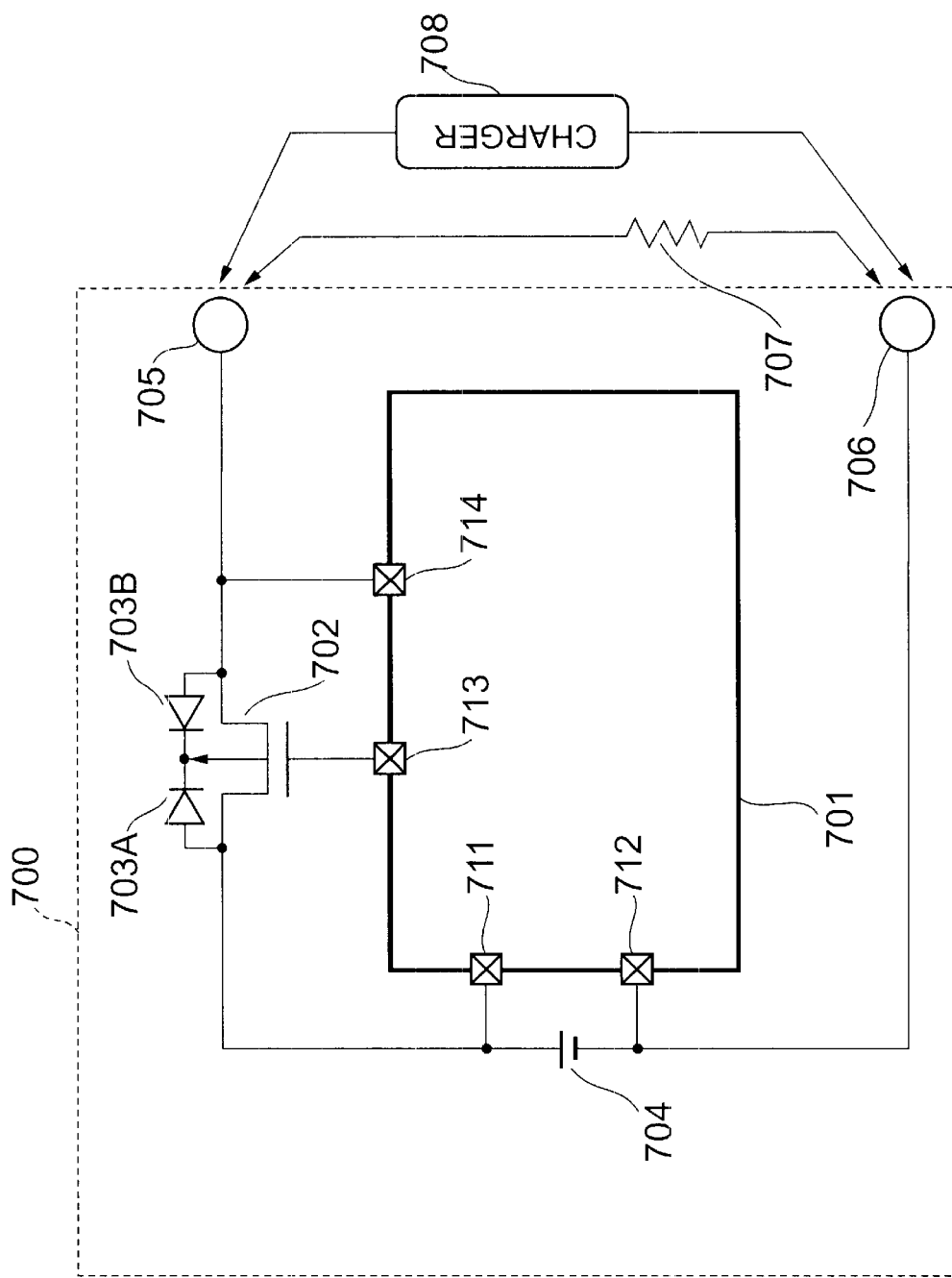
FIG. 7 is a circuit block diagram showing still another example of the charge/discharge type power supply in accordance with the present invention.

Still another embodiment of the present invention will be described with reference to FIG. 7. The difference from FIG. 1 resides in that a four-terminal MOS transistor 702 for controlling the charge/discharge operation is of the p-channel type. In the case where the voltage of the secondary battery 704 at the negative side and the voltage of the external connection negative terminal 706 are to be made common, this circuit structure is taken.

Figure 8:
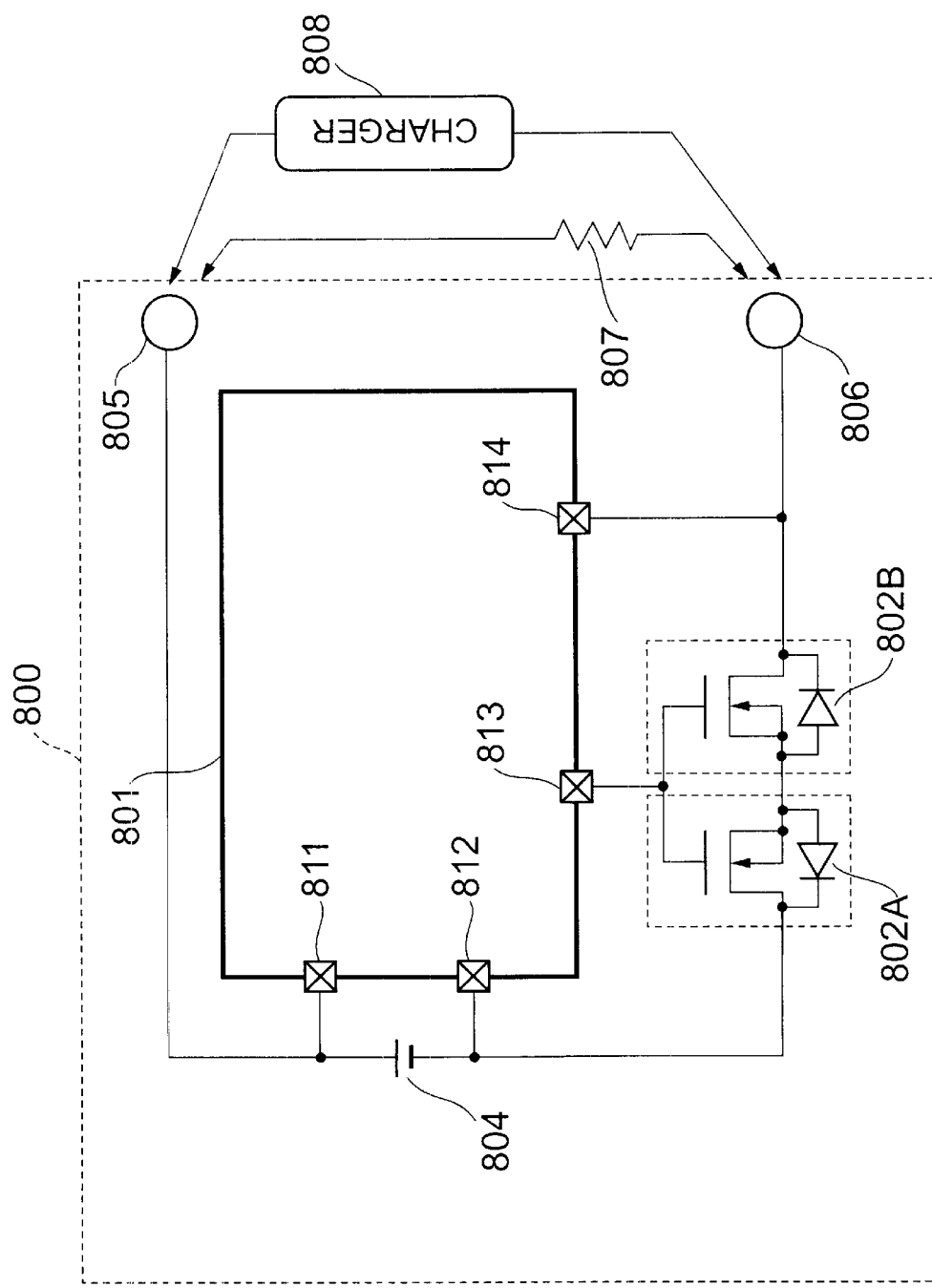
FIG. 8 is a circuit block diagram showing yet still another example of the charge/discharge type power supply in accordance with the present invention.

Yet still another embodiment of the present invention will be described with reference to FIG. 8. The difference from FIG. 1 resides in that a four-terminal MOS transistor for controlling the charge/discharge operation is made up of two three-terminal MOS transistors (802A and 802B). Even if the four-terminal MOS transistor is not used, the connection of two three-terminal MOS transistors (802A and 802B) as shown in FIG. 8 allows to achieve the same effect as that of the present invention. The diode drawn in the three-terminal MOS transistors (802A and 802B) may be parasitic or externally added.

Figure 9:
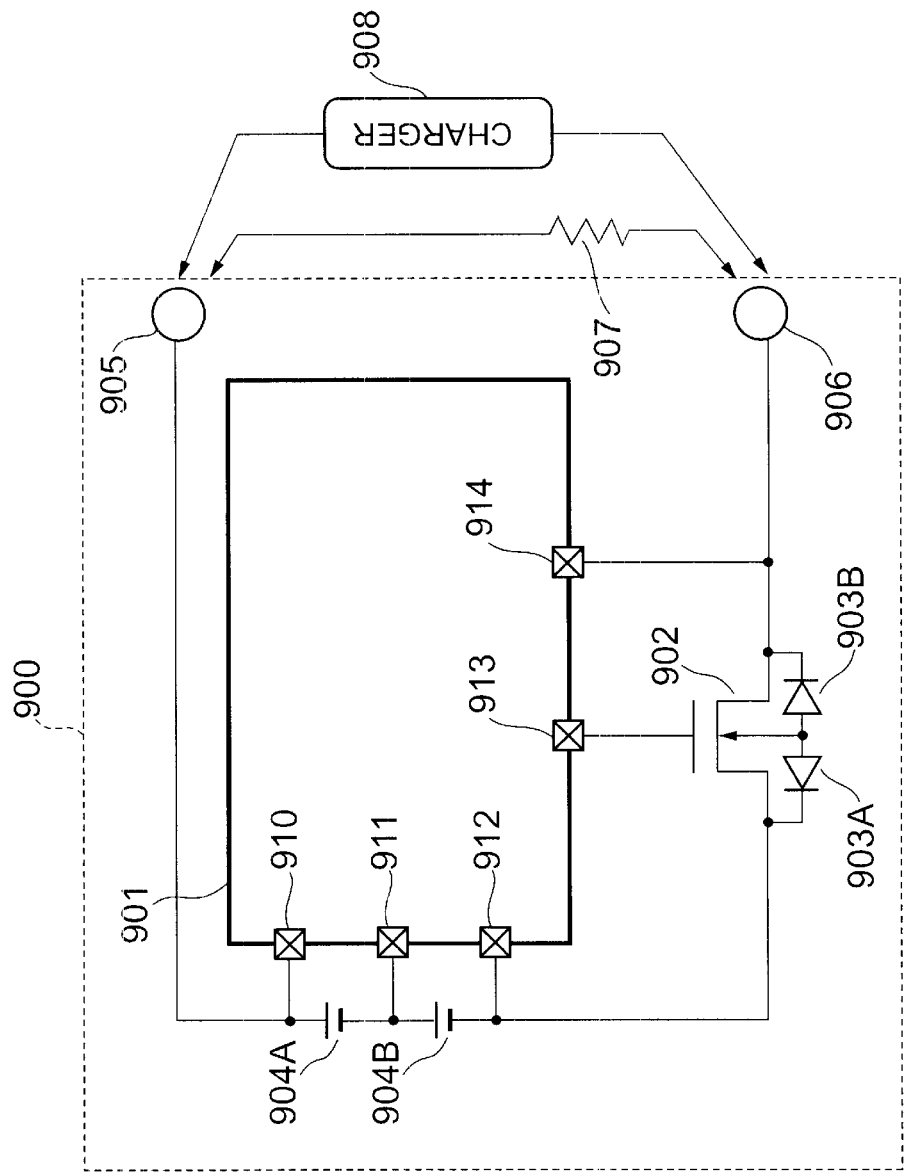
FIG. 9 is a circuit block diagram showing yet still another example of the charge/discharge type power supply in accordance with the present invention.

The above description is given to a case where one secondary battery is provided. Even in the case where two or more secondary batteries are connected in series as shown in FIG. 9, the charge/discharge type power supply of the present invention can be structured.

As was described above, according to the present invention, since no charging and discharge operation is made through the diode, the charging efficiency is enhanced to terminate the charge operation in a short period of time, and the discharging efficiency enhances to elongate the lifetime of the secondary battery. Also, since both of the charge operation and the discharge operation are controlled by using one signal line, the mounted area and the number of parts to be used are reduced, thereby making it possible to downsize the power supply and reduce the costs. Further, a reduction in the number of wirings enhances the resistance to the high-frequency noise.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A charge/discharge type power supply, comprising:
   a chargeable and dischargeable secondary battery having a positive and negative terminals;
   a switching element being connected in series to said secondary battery;
   an external connection positive terminal and an external connection negative terminal which are connected to a charger or a load, said external connection positive terminal being connected to said positive terminal of said secondary battery, and said external connection negative terminal being connected to said negative terminal of said secondary battery through said switching element; and
   a charge/discharge control circuit being connected in parallel with said secondary battery and having an over-current detection terminal being connected to said external connection negative terminal, wherein said charge/discharge control circuit monitors a voltage across said secondary battery, a voltage across said switching element and a voltage between said external connection positive terminal and said external connection negative terminal to control the on/off operation of said switching element;

wherein said switching element is a MOS transistor having a source, a drain, a gate and a body that are separated from each other, and diodes are inserted between the body and the source of said MOS transistor and between the body and the drain thereof so as to be oppositely directed.

2. A charge/discharge type power supply as claimed in claim 1, wherein said charge/discharge control circuit comprises:

an over-charge detecting circuit for detecting a state in which the voltage of said secondary battery is higher than a predetermined over-charge detection voltage;

an over-discharge detecting circuit for detecting a state in which the voltage of said secondary battery is lower than a predetermined over-discharge detection voltage;

an over-current detecting circuit for detecting a state in which the voltage across said switching element is higher than a predetermined over-current detection voltage;

a charger detecting circuit for detecting a state in which a voltage between said external connection positive terminal and said external connection negative terminal is higher than a predetermined charger detection voltage; and a control circuit for controlling the on/off operation of said switching element that controls the charge/discharge operation of said secondary battery upon receiving an output from said over-charge detecting circuit, an output from said over-discharge detecting circuit, an output from said over-current detecting circuit and an output from said charger detecting circuit.

3. A charge/discharge type power supply as claimed in claim 2, wherein said charge/discharge control circuit controls said switching element so as to be turned on when the voltage of said secondary battery is equal to or higher than the over-discharge detection voltage and is equal to or lower than the over-charge detection voltage, and when the voltage across said switching element is equal to or lower than the over-current detection voltage.

4. A charge/discharge type power supply as claimed in claim 2, wherein said charge/discharge control circuit controls said switching element so as to be turned off when the voltage across said switching element is higher than the over-current detection voltage.

5. A charge/discharge type power supply as claimed in claim 2, wherein, when the voltage of said secondary battery is lower than the over-discharge detection voltage, said charge/discharge control circuit controls said switching element so as to be turned off if the voltage between said external positive connection terminal and said external connection negative terminal is equal to or lower than the charger detection voltage and so as to be turned on if the voltage between said external positive connection terminal and said external connection negative terminal is higher than the charger detection voltage.

6. A charge/discharge type power supply as claimed in claim 2, wherein, when the voltage of said secondary battery is higher than the over-charge detection voltage, said charge/discharge control circuit controls said switching element so as to be turned on if the voltage between said external positive connection terminal and said external connection negative terminal is equal to or lower than the charger detection voltage and if the voltage across said switching element is equal to or lower than the over-current detection voltage, and so as to be turned off if the voltage between said external positive connection terminal and said external connection negative terminal is higher than the charger detection voltage or if the voltage across said switching element is higher than the over-charge detection voltage.

7. A charge/discharge type power supply as claimed in claim 2, wherein two or more secondary batteries are connected in series, and said charge/discharge control circuit controls said switching element so as to be turned off when a voltage across one of the secondary batteries is higher than the over-charge detection voltage, and a voltage across another secondary battery is lower than the over-discharger detection voltage.

8. A charge/discharge type power supply as claimed in claim 2, wherein the output of said over-current detecting circuit has a delay time.

9. A charge/discharge type power supply as claimed in claim 1, wherein said switching element comprises a plurality of MOS transistors.

10. A charge/discharge type power supply, comprising:

a chargeable and dischargeable secondary battery having positive and negative terminals;

a switching element being connected in series to said secondary battery;

an external connection positive terminal and an external connection negative terminal which are connected to a charger or a load, said external connection positive terminal being connected to said positive terminal of said secondary battery through said switching element, and said external connection negative terminal being connected to said negative terminal of said secondary battery; and a charge/discharge control circuit being connected in parallel with said secondary battery and having an over-current detection terminal being connected to said external connection positive terminal, wherein said charge/discharge control circuit monitors a voltage across said secondary battery, a voltage across said switching element and a voltage between said external connection positive terminal and said external connection negative terminal to control the on/off operation of said switching element;

wherein said switching element is a MOS transistor having a source, a drain, a gate and a body that are separated from each other, and diodes are inserted between the body and the source of said MOS transistor and between the body and drain thereof so as to be oppositely directed.

11. A charge/discharge type power supply as claimed in claim 10, wherein said charge/discharge control circuit comprises:

an over-charge detecting circuit for detecting a state in which the voltage of said secondary battery is higher than a predetermined over-charge detection voltage;

an over-discharge detecting circuit for detecting a state in which the voltage of said secondary battery is lower than a predetermined over-discharge detection voltage;

an over-current detecting circuit for detecting a state in which the voltage across said switching element is higher than a predetermined over-current detection voltage;

a charger detecting circuit for detecting a state in which a voltage between said external connection positive terminal and said external connection negative terminal is higher than a predetermined charger detection voltage; and a control circuit for controlling the on/off operation of said switching element that controls the charge/discharge operation of said secondary battery upon receiving an output from said over-charge detecting circuit, an output from said over-discharge detecting circuit, an output from said over-current detecting circuit and an output from said charger detecting circuit.

12. A charge/discharge type power supply as claimed in claim 11, wherein said charge/discharge control circuit controls said switching element so as to be turned on when the voltage of said secondary battery is equal to or higher than the over-discharge detection voltage and is equal to or lower than the over-charge detection voltage, and when the voltage across said switching element is equal to or lower than the over-current detection voltage.

13. A charge/discharge type power supply as claimed in claim 11, wherein said charge/discharge control circuit controls said switching element so as to be turned off when the voltage across said switching element is higher than the over-current detection voltage.

14. A charge/discharge type power supply as claimed in claim 11, wherein when the voltage of said secondary battery is lower than the over-discharge detection voltage, said charge/discharge control circuit controls said switching element so as to be turned off if the voltage between said external positive connection terminal and said external connection negative terminal is equal to or lower than the charger detection voltage and so as to be turned on if the voltage between said external positive connection terminal and said external connection negative terminal is higher than the charger detection voltage.

15. A charge/discharge type power supply as claimed in claim 11, wherein, when the voltage of said secondary battery is higher than the over-charge detection voltage, said charge/discharge control circuit controls said switching element so as to be turned on if the voltage between said external positive connection terminal and said external connection negative terminal is equal to or lower than the charger detection voltage and if the voltage across said switching element is equal to or lower than the over-current detection voltage, and so as to be turned off if the voltage between said external positive connection terminal and said external connection negative terminal is higher than the charger detection voltage or if the voltage across said switching element is higher than the over-current detection voltage.

16. A charge/discharge type power supply as claimed in claim 11, wherein two or more secondary batteries are connected in series, and said charge/discharge control circuit controls said switching element so as to be turned off when a voltage across one of the secondary batteries higher than the over-charge detection voltage, and a voltage across another secondary battery is lower than the over-discharger detection voltage.

17. A charge/discharge type power supply as claimed in claim 10, wherein said switching element comprises a plurality of MOS transistors.

18. A charge/discharge type power supply as claimed in claim 11, wherein the output of said over-current detecting circuit has a delay time.

19. A charge/discharge type power supply, comprising:
a chargeable and dischargeable secondary battery having a positive and negative terminals;
a switching element being connected in series to said secondary battery;
an external connection positive terminal and an external connection negative terminal which are connected to a charger or a load, said external connection positive terminal being connected to said positive terminal of said secondary battery, and said external connection negative terminal being connected to said negative terminal of said secondary battery through said switching element; and
a charge/discharge control circuit being connected in parallel with said secondary battery and having an over-current detection terminal being connected to said external connection negative terminal, wherein said charge/discharge control circuit monitors a voltage across said secondary battery, a voltage across said switching element and a voltage between said external connection positive terminal and said external connection negative terminal to control the on/off operation of said switching element;
wherein said switching element is a MOS transistor having a source, a drain, a gate and a body that are separated from each other, the gate and the body of said MOS transistor are connected to each other through a resistor.

20. A charge/discharge type power supply, comprising:
a chargeable and dischargeable secondary battery having positive and negative terminals;
a switching element being connected in series to said secondary battery;
an external connection positive terminal and an external connection negative terminal which are connected to a charger or a load, said external connection positive terminal being connected to said positive terminal of said secondary battery through said switching element, and said external connection negative terminal being connected to said negative terminal of said secondary battery; and
charge/discharge control circuit being connected in parallel with said secondary battery and having an over-current detection terminal being connected to said external connection positive terminal, wherein said charge/discharge control circuit monitors a voltage across said secondary battery, a voltage across said switching element and a voltage between said external connection positive terminal and said external connection negative terminal to control the on/off operation of said switching element;
wherein said switching element is a MOS transistor having a source, a drain, a gate and a body that are separated from each other, the gate and the body of said MOS transistor are connected to each other through a resistor.

21. A charge/discharge type power supply, comprising:
a switching element connected in series to a secondary battery;
an external connection positive and terminal and an external connection negative terminal which are connected to a charger or load, the switching element being inserted between the external connection negative terminal and a negative terminal of the secondary battery; and
a charge/discharge control circuit to control the on/off operation of the switching element,
wherein the switching element comprises a MOS transistor having a source, a drain, a gate and a body that are separated from each other, and diodes are inserted between the body and the source of the MOS transistor and between the body and the drain thereof in such a manner that they are coupled to each other at their anodes.

22. A charge/discharge type power supply, comprising:

a switching element connected in series to a secondary battery;

an external connection positive and terminal and an external connection negative terminal which are connected to a charger or load, the switching element being inserted between the external connection negative terminal and a negative terminal of the secondary battery; and a charge/discharge control circuit to control the on/off operation of the switching element, wherein the switching element comprises a MOS transistor having a source, a drain, a gate and a body that are separated from each other, and diodes are inserted between the body and the source of the MOS transistor and between the body and the drain thereof in such a manner that they are coupled to each other at their cathodes.

* * * * *